United States Patent
Kuribayashi et al.

(10) Patent No.: US 8,006,579 B2
(45) Date of Patent: Aug. 30, 2011

(54) ELECTRIC LINEAR ACTUATOR

(75) Inventors: Hiroomi Kuribayashi, Tokyo (JP);
Kentaro Eto, Tokyo (JP); Kaoru Hoshide, Tokyo (JP)

(73) Assignee: THK Co., Ltd., Tokyo (JP)

( * ) Notice: Subject to any disclaimer, the term of this patent is extended or adjusted under 35 U.S.C. 154(b) by 199 days.

(21) Appl. No.: 12/463,537

(22) Filed: May 11, 2009

(65) Prior Publication Data

US 2009/0288511 A1 Nov. 26, 2009

(30) Foreign Application Priority Data

May 26, 2008 (JP) ................................ 2008-136284

(51) Int. Cl.
*F16H 29/20* (2006.01)
(52) U.S. Cl. .................................... 74/89.38; 192/69.62
(58) Field of Classification Search ................. 74/89.38, 74/89.23; 192/69.62, 99 S, 110 B
See application file for complete search history.

(56) References Cited

U.S. PATENT DOCUMENTS

| | | | |
|---|---|---|---|
| 2,512,714 A | | 6/1950 | Carlzen |
| 3,640,140 A | * | 2/1972 | Gulick et al. ................. 74/89.38 |
| 3,752,283 A | * | 8/1973 | Fisher ........................... 192/99 S |
| 4,903,535 A | * | 2/1990 | Kikuta et al. ................... 74/89.1 |
| 4,920,816 A | | 5/1990 | Inabe et al. |
| 2007/0169578 A1 | * | 7/2007 | Christensen et al. ........ 74/89.37 |

FOREIGN PATENT DOCUMENTS

| | | |
|---|---|---|
| JP | 49-24464 U | 3/1974 |
| JP | 60-26821 A | 2/1985 |
| JP | 2005-69351 A | 3/2005 |
| JP | 2007-046637 A | 2/2007 |
| JP | 2007-071357 A | 3/2007 |

OTHER PUBLICATIONS

European Search Report dated Sep. 17, 2009, issued in corresponding European Patent Application No. 09159592.6.

* cited by examiner

*Primary Examiner* — Richard W Ridley
*Assistant Examiner* — Terence Boes
(74) *Attorney, Agent, or Firm* — Westerman, Hattori, Daniels & Adrian, LLP

(57) ABSTRACT

Provided is an electric linear actuator advantageous in downsizing and weight reduction. The electric linear actuator includes: a housing; a motor held by the housing; a nut member rotatably held with respect to the housing; a screw shaft threadedly engaged with the nut member; a drive shaft directly coupled with the motor; a rotation transmitting member rotatably supported about the drive shaft; a rotary driven member fixed to the nut member and rotated in accordance with the rotation transmitting member; a clutch member to which rotation of the drive shaft is transmitted, and which is provided so as to freely advance and retract in an axial direction of the drive shaft, and in which meshing with the rotation transmitting member is effected at an engagement position, and meshing with the rotation transmitting member is cancelled at a retraction position; and a setting lever capable of setting the clutch member to one of the advance position and the retraction position.

3 Claims, 5 Drawing Sheets

ELECTRIC LINEAR ACTUATOR

BACKGROUND OF THE INVENTION

1. Field of the Invention

The present invention relates to an electric linear actuator in which rotational movement of a motor, which is caused in response to input signals, is output after being converted into translational movement of a screw shaft by means of a feed screw mechanism, and more particularly, to an electric linear actuator having a clutch mechanism provided between a motor and a feed screw mechanism.

2. Description of the Related Art

Conventionally known examples of the electric linear actuator of this type include one disclosed in JP 2007-46637 A. The electric linear actuator transmits rotational movement of a motor to a nut member of a feed screw mechanism so that a screw shaft threadedly engaged with the nut member is caused to advance and retract in an axial direction in accordance with the rotation of the nut member.

While the motor is fixed to an actuator housing, the nut member is held by the actuator housing through an intermediation of a rotational bearing, and an output shaft of the motor and a rotation shaft of the nut member are provided parallel to each other. Multiple speed reduction gears transmit the rotation of the output shaft of the motor to the nut member, and when the motor is driven, the nut member is rotated in accordance with the rotational direction and the rotation amount thereof so that the screw shaft threadedly engaged with the nut member advances and retracts in the axial direction thereof.

Further, in the middle of the transmission path for the rotary power of the motor, which is constituted by the speed reduction gears, there is provided a clutch for controlling the rotational torque exchanged between the motor and the nut member. While transmitting rotational torque of the motor toward the nut member, the clutch prevents transmission of rotational torque toward the motor, the rotational torque being transmitted, when the nut member is rotated by an axial force acting on the screw shaft from the outside, from the nut member and received before being beared between the clutch and the actuator housing.

The electric linear actuator of this type is used, for example, in an electric reclining mechanism for airplane seats. In consideration of a use mode of the airplane seats, reclining positions have to be manually adjusted even when it becomes impossible to activate the motors thereof for some reasons or other. In this regard, in the above-mentioned conventional electric linear actuator, the clutch consequently bears the rotational torque generated by the nut member between the clutch and the actuator housing even when the screw shaft should be forcibly caused to advance and retract. Therefore, the screw shaft cannot be manually moved in the axial direction.

Further, each of the multiple speed reduction gears for transmitting the rotary power from the motor to the nut member is held by the rotational bearings. Thus, there has been a tendency that weight thereof is consequently increased owing to upsizing of the actuator housing in addition to the large number of components. In particular, weight reduction is highly demanded for the above-mentioned electric linear actuator used for airplane seats, and hence the number of components and downsizing thereof are highly demanded.

SUMMARY OF THE INVENTION

The present invention has been made in view of the above-mentioned problems, and an object of the present invention is to provide an electric linear actuator in which a screw shaft can be manually and easily caused to advance and retract in an axial direction thereof even when it becomes difficult to activate the motor thereof for some reasons or other, the number of components is small, and which can meet the demand for downsizing and weight reduction.

That is, the electric linear actuator of the present invention includes:

a housing;

a motor held by the housing;

a nut member aligned in the same axial direction as an axial direction of the motor and rotatably held with respect to the housing;

a screw shaft threadedly engaged with the nut member and advancing and retracting in an axial direction thereof in accordance with rotation of the nut member;

a drive shaft directly coupled with the motor;

a rotation transmitting member rotatably supported about the drive shaft;

a rotary driven member fixed to the nut member and rotated in accordance with the rotation transmitting member;

a clutch member to which rotation of the drive shaft is transmitted, and which is provided so as to freely advance and retract in an axial direction of the drive shaft, and has one end on which meshing with the rotation transmitting member is effected at an engagement position thereof, and another end on which meshing with the rotation transmitting member is cancelled at a retraction position thereof; and a setting lever engaged with the clutch member so as to set the clutch member to one of the advance position and the retraction position.

In the electric linear actuator of the present invention, which is constituted as described above, the drive shaft directly coupled with the motor is rotated when the motor is rotated. However, the rotation transmitting member is rotatably supported about the drive shaft so that the drive shaft is idled with respect to the rotation transmitting member. As a result, the rotational torque generated from the motor is not transmitted from the drive shaft to the rotation transmitting member. However, the rotation of the drive shaft has been transmitted to the clutch member, and hence the rotation of the motor is transmitted from the drive shaft to the rotation transmitting member through an intermediation of the clutch member when the clutch member is set to the engagement position so as to be caused to mesh with the rotation transmitting member. With this, the rotation of the motor is transmitted from the rotation transmitting member to the rotary driven member so that the nut member is rotatably driven.

Further, the meshing state between the clutch member and the rotation transmitting member is cancelled when the clutch member is set to the retraction position. As a result, it is possible to freely rotate the rotation transmitting member with respect to the drive shaft, to thereby cancel the conjunction between the motor and the nut member.

That is, in the electric linear actuator of the present invention, by operating the setting lever for the purpose of setting the clutch member to move from the engagement position to the retraction position, it is possible to separate the motor from the nut member so that the nut member can be freely rotated. As a result, it is possible to cause an external force to act on the screw shaft so that the screw shaft is caused to freely advance and retract.

Further, the rotation transmitting member is rotatably supported about the drive shaft provided with the clutch member, and hence it is unnecessary to rotatably support the rotation transmitting member with respect to the housing. As a result, it is possible to reduce the number of components in comparison with the conventional linear actuators, thereby enabling downsizing and weight reduction of the power transmission path from the motor to the nut member. Further, it is also possible to downsize the housing for accommodating the rotation transmitting member and the clutch member. In this regard also, the electric linear actuator of the present invention is further downsized and reduced in weight.

DETAILED DESCRIPTION OF THE PREFERRED EMBODIMENTS

In the following, an electric linear actuator of the present invention is described in detail with reference to the accompanying drawings.

Figure 1:
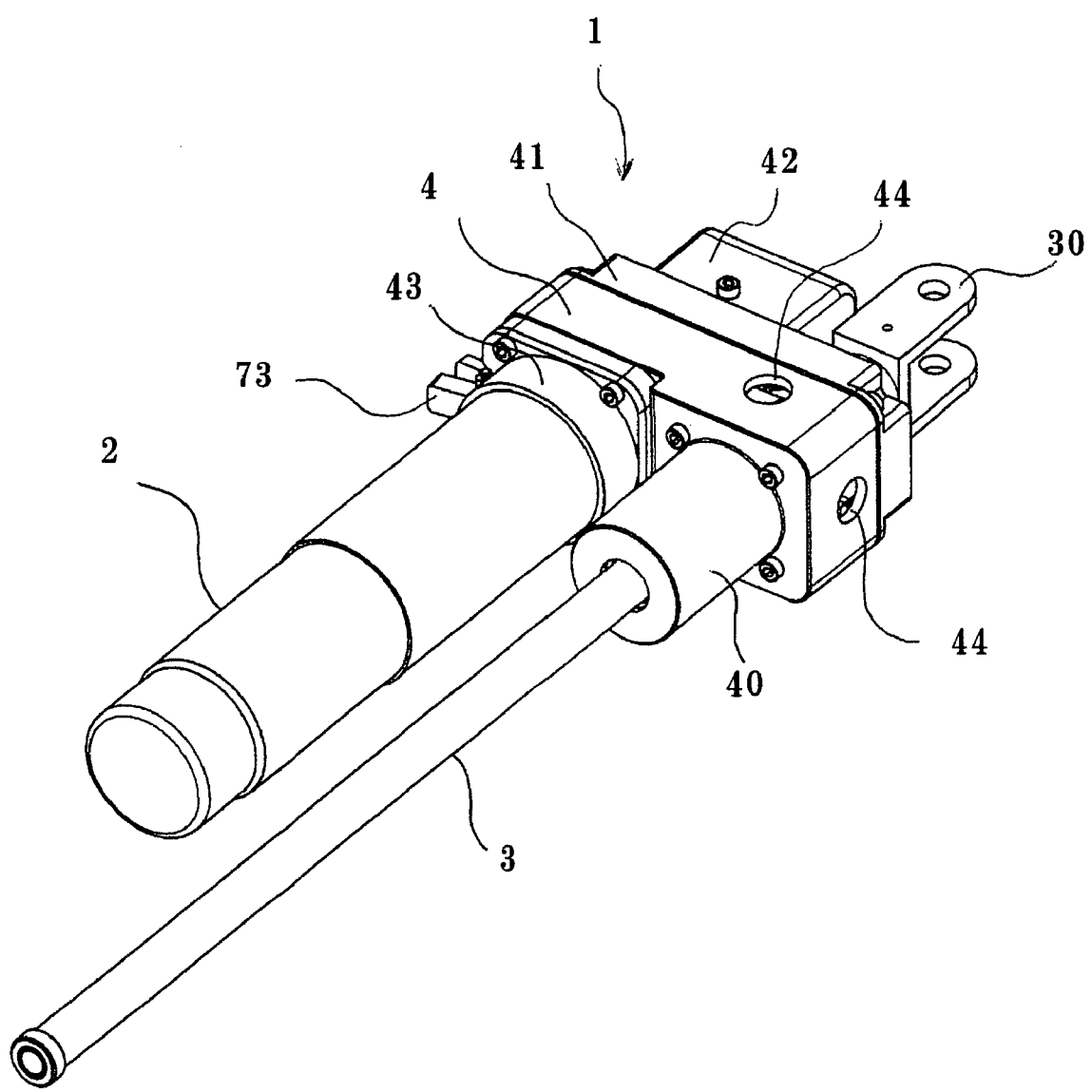
FIG. 1 is a perspective view illustrating an example of an electric linear actuator to which the present invention is applied.

FIG. 1 illustrates an embodiment of an electric linear actuator to which the present invention is applied (hereinafter, referred to as "actuator"). The actuator 1 is constituted so as to transmit rotation of a motor 2 to a nut member of a ball screw device and to rotate the nut member, thereby causing a screw shaft 3 threadedly engaged with the nut member to advance and retract in an axial direction thereof.

The motor 2 is unitized by an electromagnetic brake and a speed reduction unit having built-in planetary gears and is fixed to a housing 4 while an output shaft thereof is inserted into the inside of the housing 4. A clutch case 43 is provided between the motor 2 and the housing 4, the clutch case 43 having a built-in clutch member for arbitrarily insulating the rotation of the motor 2 and the rotation of the nut member.

Meanwhile, the housing 4 is provided with a substantially cylindrical nut accommodating portion 40 adjacent to the motor 2, and the nut member of the ball screw device is rotatably held with respect to housing 4 while being accommodated in the nut accommodating portion 40. The screw shaft 3, which constitutes the ball screw device together with the nut member, passes through the nut accommodating portion 40 so as to be threadedly engaged with the nut member. When the motor 2 is driven, the screw shaft 3 advances and retracts in the axial direction in accordance with a rotational direction thereof so that protruding length from the nut accommodating portion 40 varies.

The housing 4 accommodates pulleys and a timing belt for transmitting the rotation of the motor 2 to the nut member, and is sealed by a cover 41 fixed to the housing 4. A sensor case 42 accommodating a potentiometer is fixed to the cover 41.

The screw shaft 3 passes through the housing 4 while being provided parallel to the rotation shaft of the motor 2, and has a bracket 30, which is attached to one end thereof, for coupling therewith apparatuses constituting a mechanical linkage. Brackets (not shown) are fixed to the housing 4 with use of attachment holes 44, and the apparatuses constituting the mechanical linkage are coupled with the housing 4 through an intermediation of the brackets.

Figure 2:
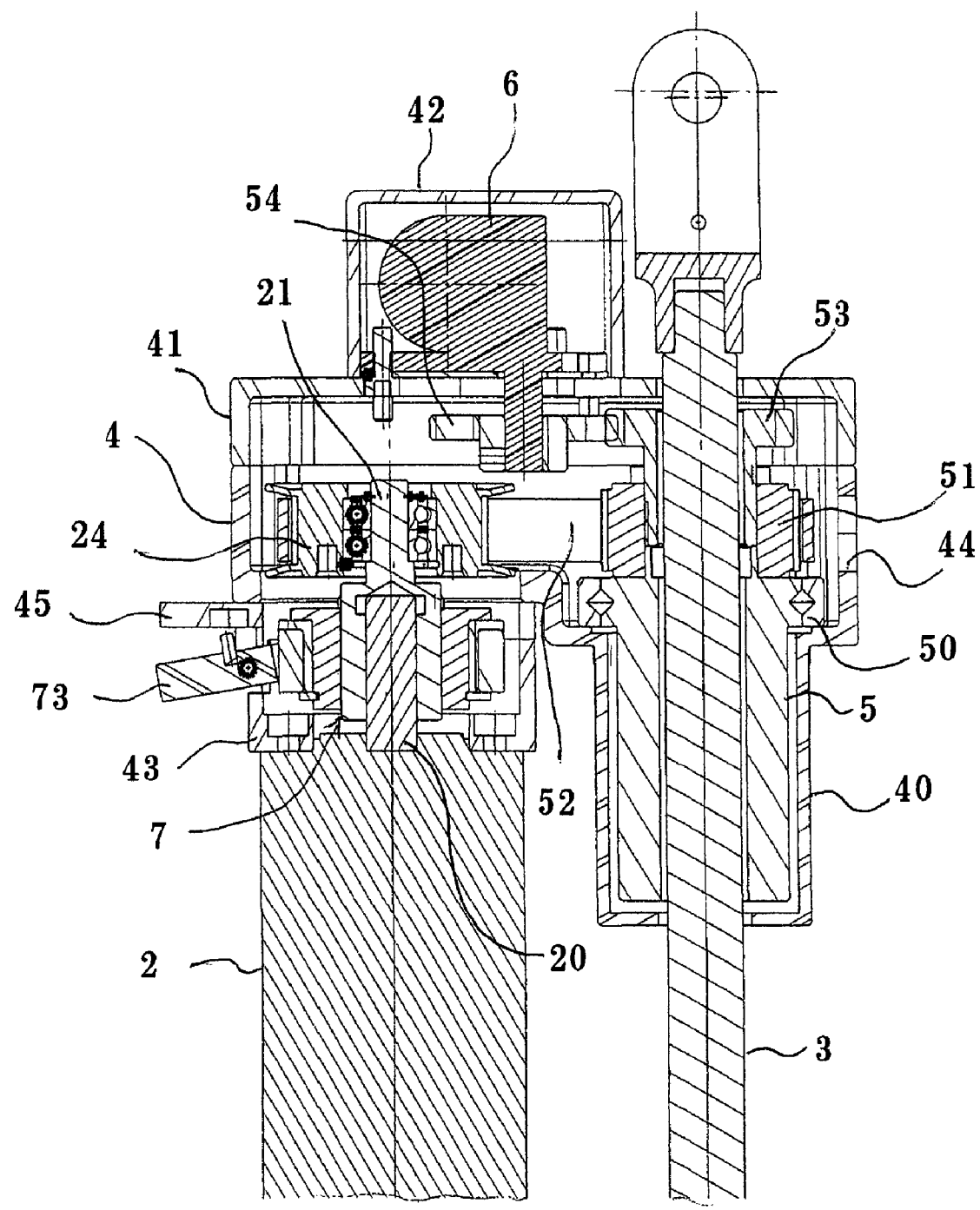
FIG. 2 is a sectional view of a main portion of the electric linear actuator illustrated in FIG. 1.

FIG. 2 is a sectional view of a main portion of the actuator 1. The ball screw device is constituted by the screw shaft 3 and a nut member 5 threadedly engaged with the screw shaft 3 through an intermediation of a large number of balls so that the screw shaft 3 advances and retracts in the axial direction thereof in accordance with the rotational direction and the rotational amount of the nut member 5. Note that, in FIG. 2, illustration of the balls existing between the screw shaft 3 and the nut member 5 is omitted.

The housing 4 holds the nut member 5 through an intermediation of a cross-roller bearing 50. The cross-roller bearing 50 is constituted by an inner race having a V-shaped groove constituting a half of a roller race in the outer peripheral surface thereof, an outer race having a V-shaped groove constituting another half of the roller race in the inner peripheral surface thereof, and a large number of rollers arranged in the roller race formed between the inner race and the outer race, the rollers being arranged in the roller race in a state of having alternate rotational axes of 90 degrees. With this, it is possible to exert sufficient bearing capacity even against axial load acting in the direction of the rotation shaft of the nut member 5. In the ball screw device illustrated in FIG. 2, the inner race of the cross-roller bearing 50 is formed as a flange portion of the nut member 5, and hence downsizing and weight reduction of the ball screw device are realized while sufficient load bearing capacity is imparted therewith. The nut member 5 fixes, while the cylindrical portion thereof is loosely fitted to the nut accommodating portion 40 of the housing 4, the outer race of the cross-roller bearing 50 to the housing 4, thereby being rotatably held on the inside of the nut accommodating portion 40.

Note that, in this embodiment, the ball screw device is used as means for converting rotational movement generated by a motor into translational movement of the shaft. However, it is also possible to adopt a feed screw device of a sliding contact type in which balls are not used.

A driven pulley 51 serving as a rotary driven member is fixed to the nut member 5, and a timing belt 52 transmits the rotation of the motor 2 to the driven pulley 51 so that the nut member 5 is rotated in accordance with the operation of the motor 2.

Further, the rotation of the nut member 5 is transmitted to the potentiometer 6 accommodated in the sensor case 42 through an intermediation of two speed reduction gears 53 and 54. A resistance value of the potentiometer 6 varies in accordance with a rotation amount input thereto, and hence the rotation of the nut member 5 is input to the potentiometer 6, whereby the rotation amount of the nut member 5, that is, the axial movement amount of the screw shaft 3 can be stored as a resistance value of the potentiometer 6. As a result, by detecting the resistance value, it is possible to understand the absolute position of the screw shaft 3 with respect to the housing 4, which can be utilized for rotation control of the motor 2.

Figure 3:
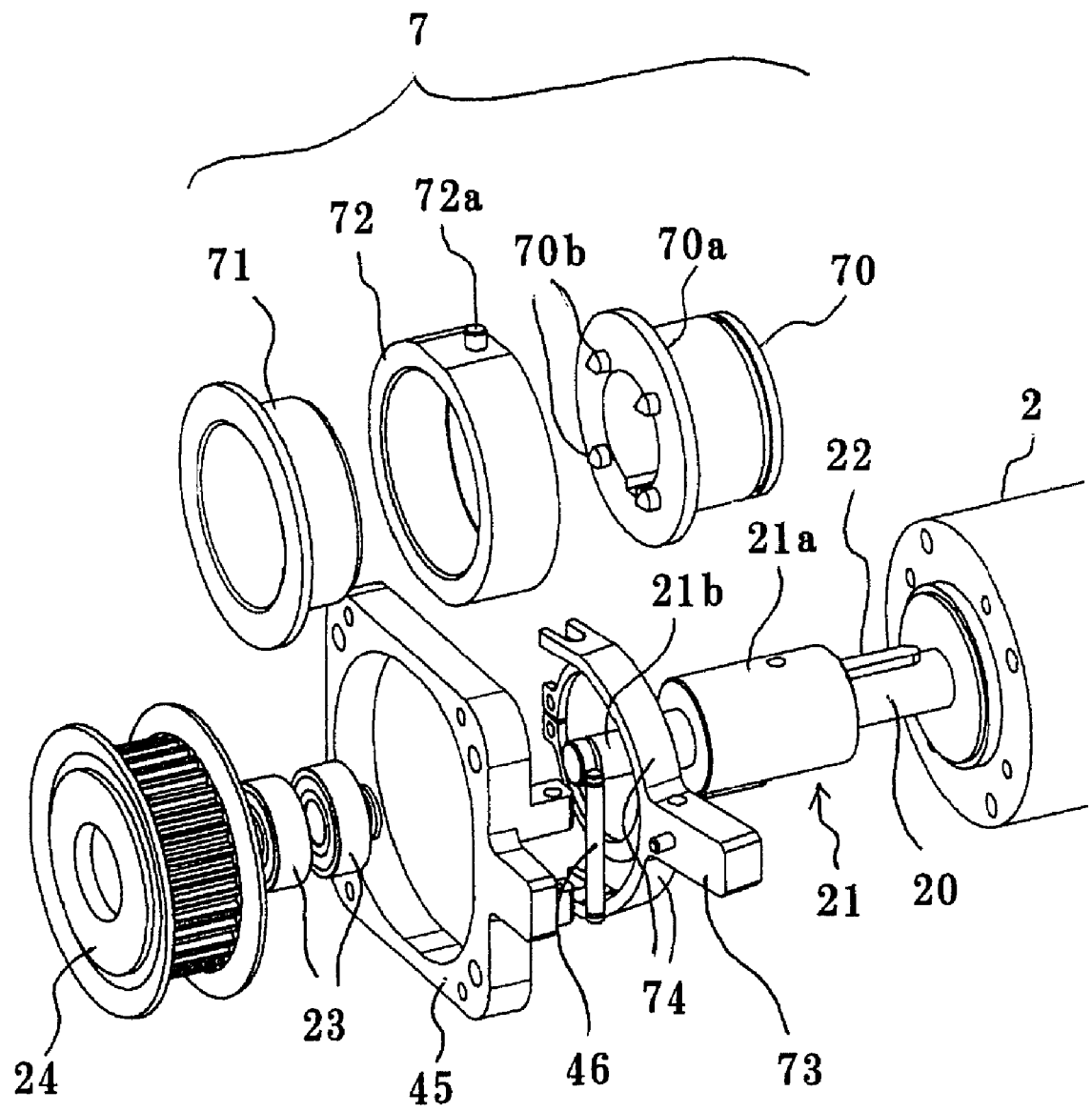
FIG. 3 is an exploded perspective view of components mounted to an output shaft of a motor.

Meanwhile, an output shaft 20 of the motor 2 is inserted into the inside of the clutch case 43, and coupled with a drive shaft 21 in the inside of the clutch case 43. FIG. 3 is an exploded perspective view of components mounted to the output shaft 20 of the motor 2. The drive shaft 21 is a stepped shaft constituted by a larger diameter portion 21a and a smaller diameter portion 21b, and the output shaft 20 of the motor 2 is fitted with respect to a hollow portion provided in the larger diameter portion 21a. While the drive shaft 21 covers the output shaft 20 so that the rotation thereof is supported, no bearing is provided between the drive shaft 21 and the housing 4. In addition, a key 22 couples the drive shaft 21 and the output shaft 20 with each other so as to directly transmit the rotation of the motor 2 to the drive shaft 21.

A driving pulley 24 serving as a rotation transmitting member is mounted to the smaller diameter portion 21b of the drive shaft 21 through an intermediation of a pair of ball bearings 23. Accordingly, the driving pulley 24 is rotatable with respect to the drive shaft 21 serving as a spindle. The output shaft 20 of the motor 2 and the driving pulley 24 remain separated from each other as long as a clutch member 7 described later does not mesh with the driving pulley 24. The timing belt 52 is looped around the driving pulley 24 and the driven pulley 51 so that the rotation of the motor 2 is transmitted from the driving pulley 24 to the driven pulley 51 through an intermediation of the timing belt 52 when the clutch member 7 couples the driving pulley 24 and the output shaft 20 of the motor 2 with each other.

Note that, in the actuator 1, the pair of pulleys 24 and 51 and the timing belt 52 transmit the rotation of the output shaft 20 of the motor 2 to the nut member 5. However, gears or chains may be used for transmitting the rotation to the nut member 5.

The clutch member 7 is constituted by a first clutch block 70 formed into a substantially cylindrical shape and fitted to the outer side of the smaller diameter portion 21b of the drive shaft 21, a bearing bush 71 fitted to the outer side of the first clutch block 70, and a second clutch block 72 fitted to the outer side of the bearing bush 71.

The first clutch block 70 is fitted to the larger diameter portion 21a of the drive shaft 21 so as to be movable in the axial direction, and a key (not shown) is interposed between the first clutch block 70 and the larger diameter portion 21a so as to transmit the rotation of the drive shaft 21 to the first clutch block 70. Further, the first clutch block 70 is provided with a flange portion 70a facing the driving pulley 24, the flange portion 70a being provided with multiple upright studs 70b. Meanwhile, the side surface of the driving pulley 24 opposed to the flange portion 70a of the first clutch block 70 is provided with regulation holes to which the studs 70b are fitted. When the first clutch block 70 moves in the axial direction thereof to the drive shaft 21 so as to come close to the driving pulley 24, the studs 70b are fitted into the regulation holes of the driving pulley 24 so that the driving pulley 24 and the first clutch block 70 are integrated by meshing with each other. For the purpose of causing, regardless of the rotational position of the driving pulley 24, the studs 70b of the first clutch block 70 to be fitted into the regulation holes of the driving pulley 24, a large number of the regulation holes are provided in the driving pulley 24 at pitches shorter than those of the studs 70b.

Further, the second clutch block 72 is fitted to the outer side of the first clutch block 70 through an intermediation of the bearing bush 71. That is, the second clutch block 72 is held by the larger diameter portion 21a of the drive shaft 21 so as to be movable in the axial direction of the larger diameter portion 21a together with the first clutch block 70. Note that, the first clutch block 70, the bearing bush 71, and the second clutch block 72 are integrated by a snap ring mounted to the first clutch block 70.

A setting lever 73 is engaged with the second clutch block 72. The setting lever 73 is coupled, through an intermediation of a pin 46, with a base plate 45 fixed to the housing 4 so as to be rockable about the pin 46. The setting lever 73 is provided with a pair of transmission arms 74 holding the second clutch block 72, and engagement grooves for accommodating engagement pins 72a protruding on the outer peripheral surface of the second clutch block 72 are formed at the distal ends of the transmission arms 74. Thus, when the setting lever 73 is slid around the pin 46, the second clutch block 72 is pressed in the axial direction of the drive shaft 21 so that the bearing bush 71 engaged with the inside of the second clutch block 72 and the first clutch block 70 consequently move together with the second clutch block 72 in the axial direction of the drive shaft 21. Further, the second clutch block 72 is engaged with the setting lever 73, and hence can not be rotated together with the drive shaft 21. However, the bearing bush 71 is interposed between the second clutch block 72 and the first clutch block 70, and hence the first clutch block 70 can be rotated together with the drive shaft 21. Note that, the base plate 45 is provided between the housing 4 and the clutch case 43, and holds the clutch case 43 with respect to the housing 4.

A coil spring (not shown) in a compressed state is interposed between the setting lever 73 and the base plate 45, the setting lever 73 constantly pressing the second clutch block 72 to the driving pulley 24 by an urging force of the coil spring. With this, in a state in which the setting lever 73 is not operated at all, the flange portion 70a of the first clutch block 70 is pressed against the side surface of the driving pulley 24. Then, the studs 70b provided upright on the flange portion 70a are fitted into the regulation holes of the driving pulley 24 so as to maintain the meshing state between the first clutch block 70 and the driving pulley 24.

Figure 4:
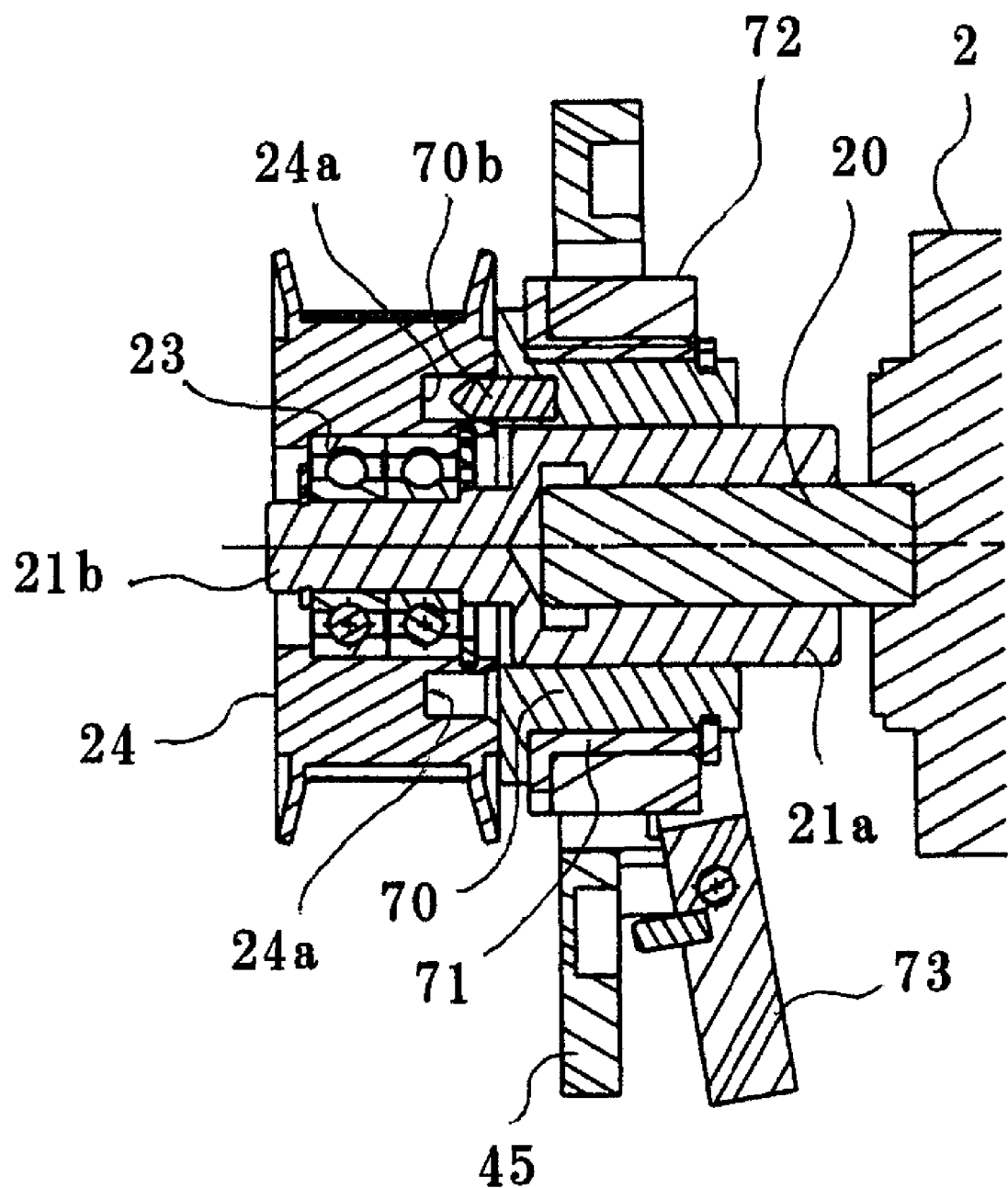
FIG. 4 is a sectional view illustrating a state in which rotation of the output shaft of the motor has been transmitted to a driving pulley.

FIG. 4 is a sectional view illustrating a state in which the rotation of the output shaft 20 of the motor 2 has transmitted to the driving pulley 24, that is, a state in which the clutch member 7 is set to the advance position. In this state, the studs 70b of the first clutch block 70 are fitted with respect to the regulation holes 24a formed in the side surface of the driving pulley 24, whereby the meshing state between the driving pulley 24 and the first clutch block 70 is maintained. In this case, even though the setting lever 73 is not operated at all, the meshing state is maintained by the above-mentioned urging force of the coil spring. When the output shaft 20 of the motor 2 is rotated in this state, the drive shaft 21 covering the output shaft 20 and the first clutch block 70 fitted to the larger diameter portion 21a of the drive shaft 21 are rotated in synchronism with the output shaft 20. Accordingly, the driving pulley 24 meshing with the first clutch block 70 is also rotated in synchronism with the output shaft 20.

With this, the timing belt 52 and the driven pulley 51 transmit the rotation of the output shaft 20 of the motor 2 to the nut member 5, thereby causing the screw shaft 3 threadedly engaged with the nut member 5 to advance and retract in the axial direction in accordance with the rotation of the output shaft 20 of the motor 2.

Figure 5:
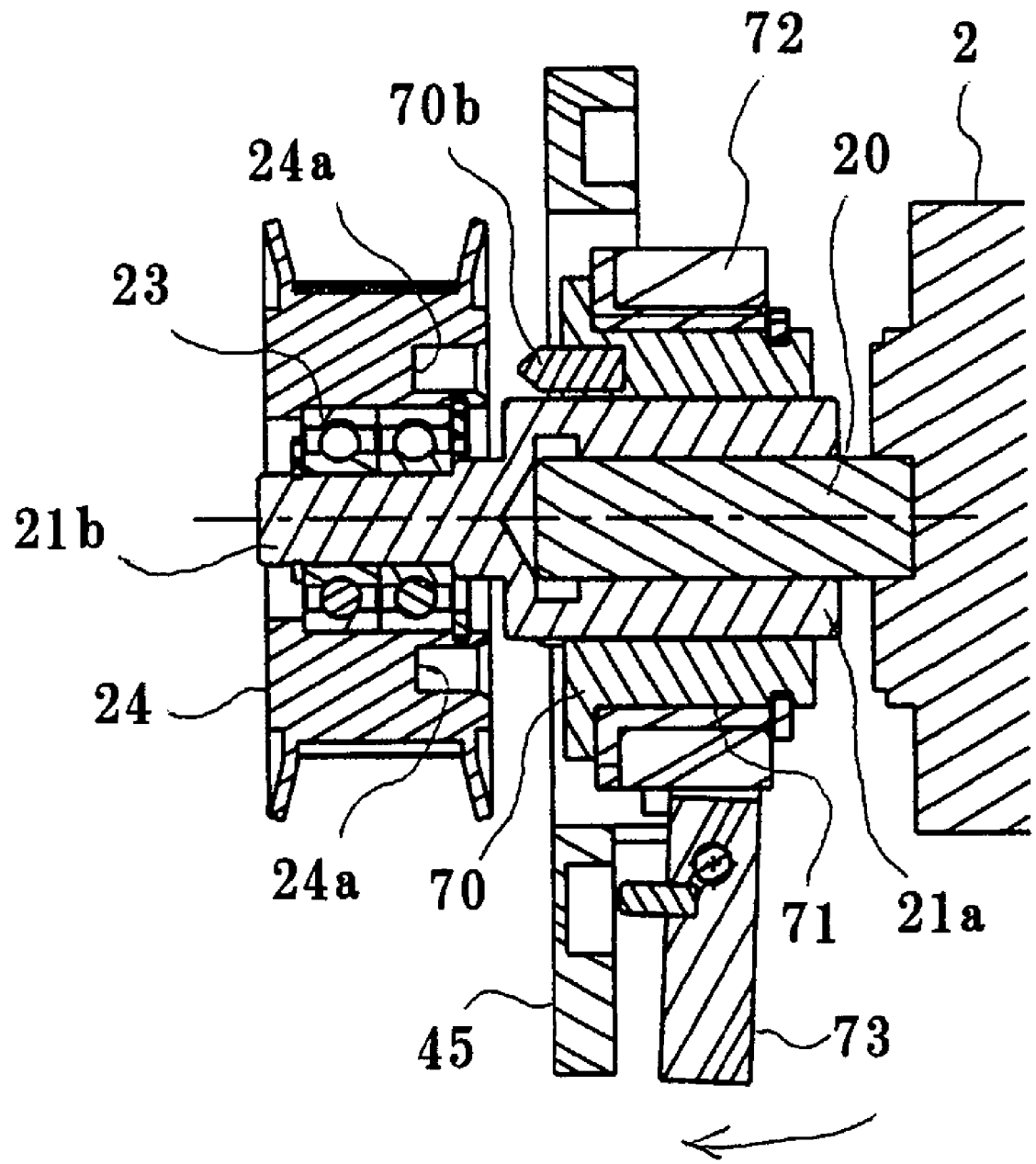
FIG. 5 is a sectional view illustrating a state in which the output shaft of the motor and the driving pulley are separated from each other.

Meanwhile, FIG. 5 is a sectional view illustrating a state in which the output shaft 20 of the motor 2 and the driving pulley 24 are separated from each other, that is, a state in which the clutch member 7 is set to the retraction position. When fingers are applied to the setting lever 73 and the base plate 45 so as to pinch them against the urging force of the spring, the second clutch block 72 engaged with the setting lever 73 moves along the drive shaft 21 toward the motor 2. Therefore, the first clutch block 70 integrated with the second clutch block 72 is separated from the driving pulley 24. With this, the studs 70b of the first clutch block 70 are detached from the regulation holes 24a of the driving pulley 24, whereby the driving pulley 24 becomes rotatable with respect to the first clutch block 70 and the drive shaft 21.

Accordingly, the setting lever 73 is operated so that the driving pulley 24 is separated from the output shaft 20 of the motor 2 so as to be freely rotated. As a result, the nut member 5 can be easily rotated when an external force in the axial direction is applied with respect to the screw shaft 3. That is, according to the actuator 1 of the present invention, the positional adjustment of the screw shaft 3 with respect to the housing 4 can be easily performed in the middle of the operation of the setting lever 73. For example, even when positional adjustment of a mechanical linkage constituted by the actuator 1 is to be performed without use of the motor 2, the adjustment can be easily performed by the operation of the setting lever 73.

Further, while in the actuator 1, the clutch member 7 and the driving pulley 24 transmit the rotation of the output shaft 20 of the motor 2 to the nut member 5, the rotations of the clutch member 7 and the driving pulley 24 are not supported with respect to the housing 4, and the clutch member 7 and the driving pulley 24 are held by the output shaft 20. Thus, the structure of the housing 4 is simple, and the number of components constituting the transmission path for the rotational movement is minimized. Accordingly, the actuator 1 is further downsized and reduced in weight, and hence is optimum as an electric linear actuator used in applications in which those matters are highly demanded, especially in airplanes.

What is claimed is:

1. An electric linear actuator, comprising:
    a housing;
    a motor held by the housing;
    a nut member aligned in the same axial direction as an axial direction of the motor and rotatably held with respect to the housing;
    a screw shaft threadedly engaged with the nut member and advancing and retracting in an axial direction thereof in accordance with rotation of the nut member;
    a drive shaft directly coupled with the motor;
    a rotation transmitting member rotatably supported about the drive shaft;
    a rotary driven member fixed to the nut member and rotated in accordance with the rotation transmitting member;
    a clutch member to which rotation of the drive shaft is transmitted, and which is provided so as to freely advance and retract in an axial direction of the drive shaft, and has one end on which meshing with the rotation transmitting member is effected at an engagement position thereof, and another end on which meshing with the rotation transmitting member is cancelled at a retraction position thereof; and
    a setting lever engaged with the clutch member so as to set the clutch member to one of the engagement position and the retraction position,
    wherein the clutch member comprises:
    a first clutch block, which is provided with an engagement pin meshing with the rotation transmitting member, and to which the transmission of the rotation of the drive shaft is transmitted;
    a second clutch block held by the setting lever and movable in the axial direction of the drive shaft; and
    a bearing bush arranged between the first clutch block and the second clutch block, for rotatably supporting the first clutch block with respect to the second clutch block.

2. The electric linear actuator according to claim 1, wherein:
    the rotation transmitting member and the rotary driven member constitute a pair of pulleys; and
    a timing belt is looped around the pair of pulleys.

3. The electric linear actuator according to claim 1, wherein the rotary driven member has a potentiometer connected thereto through an intermediation of a speed reducer.

* * * * *